(12) United States Patent
Stegmaier

(10) Patent No.: US 10,144,485 B2
(45) Date of Patent: Dec. 4, 2018

(54) ADAPTIVE MOTOR TORQUE ADJUSTMENT FOR ELECTRIC TWO-WHEELED VEHICLES

(71) Applicant: Robert Bosch GmbH, Stuttgart (DE)

(72) Inventor: Juergen Stegmaier, Tuebingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 48 days.

(21) Appl. No.: 14/909,194

(22) PCT Filed: Jun. 6, 2014

(86) PCT No.: PCT/EP2014/061780
§ 371 (c)(1),
(2) Date: May 13, 2016

(87) PCT Pub. No.: WO2015/014519
PCT Pub. Date: Feb. 5, 2015

(65) Prior Publication Data
US 2016/0251057 A1 Sep. 1, 2016

(30) Foreign Application Priority Data
Aug. 2, 2013 (DE) .......................... 10 2013 215 287

(51) Int. Cl.
*B62M 6/45* (2010.01)
*B60L 11/00* (2006.01)
(Continued)

(52) U.S. Cl.
CPC .............. *B62M 6/45* (2013.01); *B60L 11/007* (2013.01); *B60L 15/20* (2013.01); *B60L 15/30* (2013.01);
(Continued)

(58) Field of Classification Search
CPC ........................................................ B62M 6/45
See application file for complete search history.

(56) References Cited

U.S. PATENT DOCUMENTS

| 5,910,714 A | 6/1999 | Buchanan et al. |
| 2013/0054068 A1* | 2/2013 | Shoge ............... B62M 6/45 |
| | | 701/22 |

(Continued)

FOREIGN PATENT DOCUMENTS

| EP | 0 893 338 | 1/1999 | |
| EP | 0893338 A1 * | 1/1999 | ............. B62M 6/45 |

(Continued)

OTHER PUBLICATIONS

International Search Report for PCT/EP2014/061780, dated Sep. 18, 2014.

*Primary Examiner* — Imran K Mustafa
(74) *Attorney, Agent, or Firm* — Norton Rose Fulbright US LLP; Gerard Messina

(57) ABSTRACT

A method for adjusting a motor torque of an electric two-wheeled vehicle, including the following steps: reading in a driver assistance profile which represents a dependency of the motor torque on a pedaling action of the driver, determining at least one predefined range in the driver assistance profile, the range having at least one nonconstant change within the driver assistance profile, in particular in the slope of the driver assistance profile, and ascertaining a future speed of the electric two-wheeled vehicle as a function of an instantaneous speed of the electric two-wheel vehicle and a pedaling action of the driver. The motor torque is changed, in particular decreased or increased, as a function of the pedaling action of the driver, deviating from the driver assistance profile, based on a check as to whether the future speed of the electric two-wheeled vehicle is within the predefined range.

17 Claims, 4 Drawing Sheets

(51) Int. Cl.
*B60L 15/20* (2006.01)
*B60L 15/30* (2006.01)
(52) U.S. Cl.
CPC ....... *B60L 2200/12* (2013.01); *B60L 2240/12* (2013.01); *B60L 2240/423* (2013.01); *B60L 2250/28* (2013.01); *Y02T 10/645* (2013.01); *Y02T 10/72* (2013.01); *Y02T 10/7275* (2013.01)

(56) References Cited

U.S. PATENT DOCUMENTS

2013/0090818 A1* 4/2013 Fujii .................... B60W 10/06
 701/60
2014/0039742 A1* 2/2014 Tanaka ................. B60L 11/007
 701/22

FOREIGN PATENT DOCUMENTS

EP 0893338 A1 * 1/1999 ............. B62M 6/45
JP 2011-068244 4/2011

* cited by examiner

ADAPTIVE MOTOR TORQUE ADJUSTMENT FOR ELECTRIC TWO-WHEELED VEHICLES

FIELD OF THE INVENTION

The present invention relates to a method and a system for adjusting the motor torque of an electric two-wheeled vehicle.

BACKGROUND INFORMATION

Electric two-wheeled vehicles have various driver assistance profiles for motorized assistance of the driver. These driver assistance profiles reflect the dependency between the motor torque and the desired speed of the driver, usually in the form of a curve. The curve has one to multiple inflection points, depending on the driver assistance profile. It is known that the control of the motor is based on the setting by the driver assistance profile. Therefore, when the inflection point in the driver assistance profile is passed, the control of the motor changes in a way that is perceptible to the driver. This reduces the comfort of the driver.

In addition, the allowable motor-assisted maximum speed of an electric two-wheeled vehicle is limited by regulatory requirements. For this reason, the motor assistance must be cut off no later than when this maximum speed is reached. In Germany, this maximum speed is, for example, 25 km/h for pedelecs (pedal electric cycle).

To prevent an abrupt discontinuation of the motor assistance, it is known to provide a speed range in which the motor assistance is scaled back in steps until the maximum speed is reached. This reduction range is implemented in the form of a ramp function.

A flat reduction ramp, i.e., in which the speed at which the reduction starts is far from the maximum speed, results in a comfortable, homogeneous driving impression in the range of the reduced speed.

In addition, it is believed to be understood that a steep reduction ramp, i.e., in which the speed at which the reduction starts is close to the maximum speed, is relatively uncomfortable for the driver, since the motor assistance drops off in a clearly perceivable manner.

SUMMARY OF THE INVENTION

The method and the system for adjusting a motor torque of an electric two-wheeled vehicle includes reading in a driver assistance profile which represents a dependency of the motor torque on a pedaling action of the driver. In addition, at least one predefined range in the driver assistance profile is determined. This involves speed ranges. This predefined range contains a point, i.e., a speed value, in the driver assistance profile at which the dependency relationship of the motor torque and the pedaling action of the driver has a nonconstant change, for example in the slope of the curve which represents the dependency relationship. The nonconstant change in the slope of the curve of the driver assistance profile is understood to mean that the curve of the driver assistance profile has inflection points which, when passed, result in an abrupt change in the control of the motor which is perceptible to the driver. In addition, a future speed of the electric two-wheeled vehicle is ascertained as a function of an instantaneous speed of the electric two-wheeled vehicle and a pedaling action of the driver.

According to the present invention, a check is made as to whether the future speed of the electric two-wheeled vehicle is within the predefined range. If this is the case, the motor torque is adjusted or changed as a function of the pedaling action of the driver, deviating from the dependency relationship in the driver assistance profile. The motor torque is either decreased or increased in relation to the value in the driver assistance profile.

The advantage is that abrupt transitions in the motor torque assistance during an acceleration or deceleration operation cease, the motor is thus spared, and the driving comfort for the driver is increased.

In one refinement, a lower and an upper limiting value are determined which delimit the predefined range. The limiting values are determined at an interval of +/−5 km/h, +/−4 km/h, +/−3 km/h, +/−2 km/h, +/−1 km/h around a speed value, at which point the nonconstant change in the dependency relationship is in the driver assistance profile. Alternatively, the limiting values are determined in a range of +/−2.5%, +/−5%, +/−7.5%, +/−10%, +/−15%, or +/−20% around the speed value. In both cases, the absolute value of the distance between the lower limiting value and the speed value does not have to be the same as the distance between the upper limiting value and the speed value.

It is advantageous that the size of the range in which the driver assistance profile is adapted is variably adjustable.

In another embodiment, the motor torque is linearly adjusted between the lower and the upper limiting values of the predefined range, deviating from the driver assistance profile, when the future speed of the electric two-wheeled vehicle is in the predefined range.

In one refinement, beginning at the instantaneous speed of the electric two-wheeled vehicle, the motor torque is changed as a function of the pedaling action of the driver, deviating from the driver assistance profile, when the future speed of the electric two-wheeled vehicle is in the predefined range.

In this regard, it is advantageous that the assistance of the driver is adapted early according to the driver input.

In another embodiment, beginning when the instantaneous speed exceeds or reaches a lower limiting value of the predefined range, the motor torque, deviating from the driver assistance profile, is adjusted when the future speed of the electric two-wheeled vehicle is in the predefined range. The "exceedance" is understood to mean the passing of the lower limiting value as a type of threshold value; i.e., the instantaneous speed is thus in the predefined range.

In one refinement, beginning when the instantaneous speed falls below or reaches an upper limiting value of the predefined range, the motor torque, deviating from the driver assistance profile, is changed when the future speed of the electric two-wheeled vehicle is in the predefined range. The "falling below" is understood to mean the passing of the upper limiting value as a type of threshold value; i.e., the instantaneous speed is thus in the predefined range.

In this regard, it is advantageous that the assistance of the driver is individually adapted during acceleration and also during reduction of the instantaneous speed.

In another embodiment, the control unit includes a microcontroller.

Further advantages result from the following description of exemplary embodiments and from the further descriptions herein.

The present invention is explained below with reference to specific embodiments and the appended drawings.

DETAILED DESCRIPTION

Electric two-wheeled vehicles, for example a pedelec, eBike, or eScooter, are characterized in that the driver torque generated by the driver may be assisted by an additional, so-called motor torque. Thus, for the drive of the electric two-wheeled vehicle, a higher overall torque results than with a conventional bicycle at the same driver torque.

To allow comfortable driving for the driver with motor assistance up to high speeds, it is important that the support by the motor takes place uniformly; i.e., the motor assistance should not change greatly within a short time, for example during an acceleration or deceleration operation.

In addition, the maximum speed which is allowable with motor assistance is limited due to regulatory requirements. In Germany, this allowable maximum speed is 25 km/h for pedelecs, for example. The motor assistance must be cut off no later than when the allowable maximum speed is reached. To still allow comfortable driving for the driver with motor assistance up to high speeds, it is therefore important that the reduction behavior has a high level of motor assistance up to the vicinity of the maximum speed, and also has a gentle reduction of the motor torque.

Figure 1:
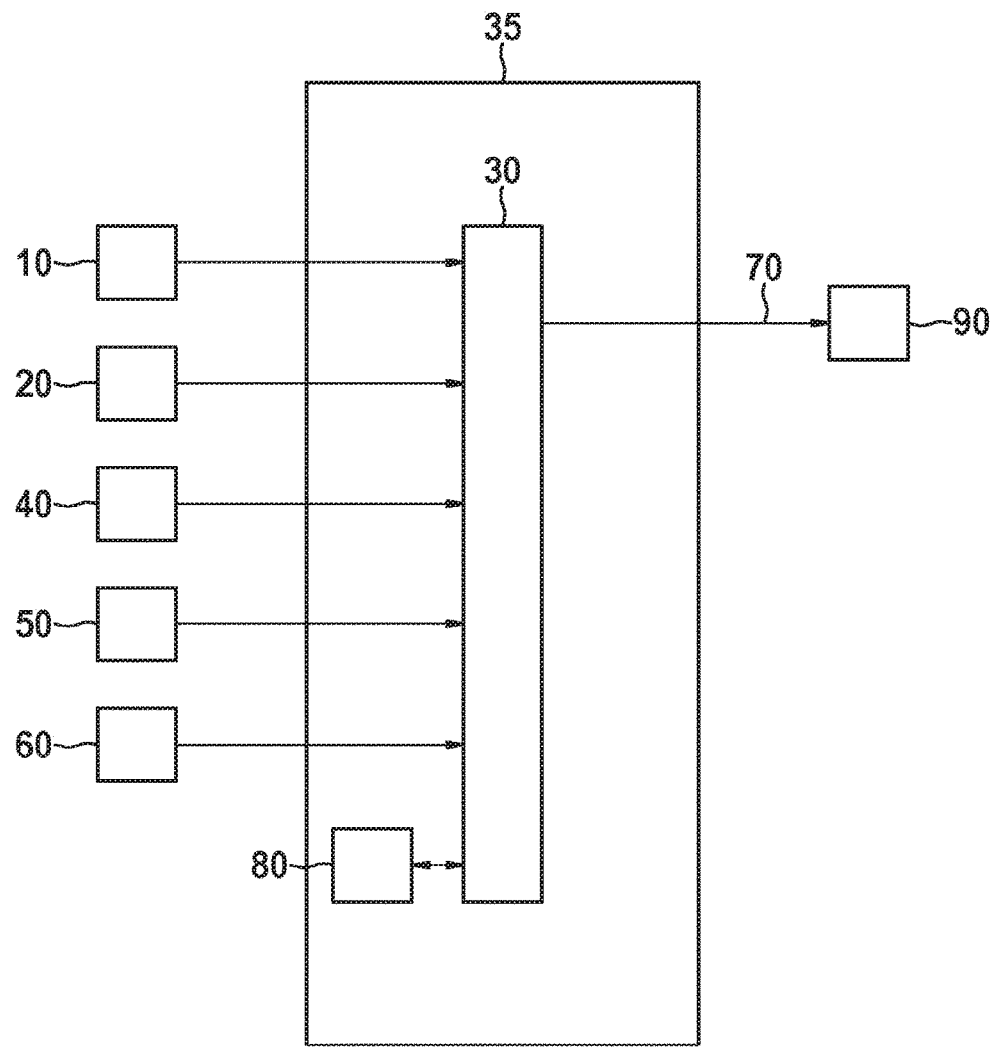
FIG. 1 shows a device for adjusting a motor torque of an electric two-wheeled vehicle.

FIG. 1 shows a device for adjusting a motor torque of an electric two-wheeled vehicle. The device has a control unit 35. Control unit 35 includes a microcontroller 30 and a memory unit 80. Control unit 35 detects the instantaneous speed of the electric two-wheeled vehicle with the aid of a speedometer 10. In addition, control unit 35 determines the pedaling action of the driver, which is detected with the aid of a sensor. This takes place, for example, with the aid of a pedaling frequency sensor 40 which detects the pedaling frequency of the driver. Alternatively, the pedaling action may be determined at the foot pedal with the aid of a torque sensor 50. Furthermore, control unit 35 optionally detects a further measured variable, the instantaneous overall acceleration of the electric two-wheeled vehicle, with the aid of an acceleration sensor 20, for example.

The weight of the electric two-wheeled vehicle may be input at the factory with the aid of an onboard computer 60 and stored in memory unit 80. The weight of the driver may likewise be input with the aid of onboard computer 60 or automatically ascertained with an appropriate algorithm, and stored in memory 80.

In addition, driver assistance profiles are stored in memory 80 at the factory, for example with the aid of onboard computer 60, or directly. With the aid of onboard computer 60, the driver may likewise generate his/her own driver assistance profiles, which are stored in memory 80.

Figure 2:
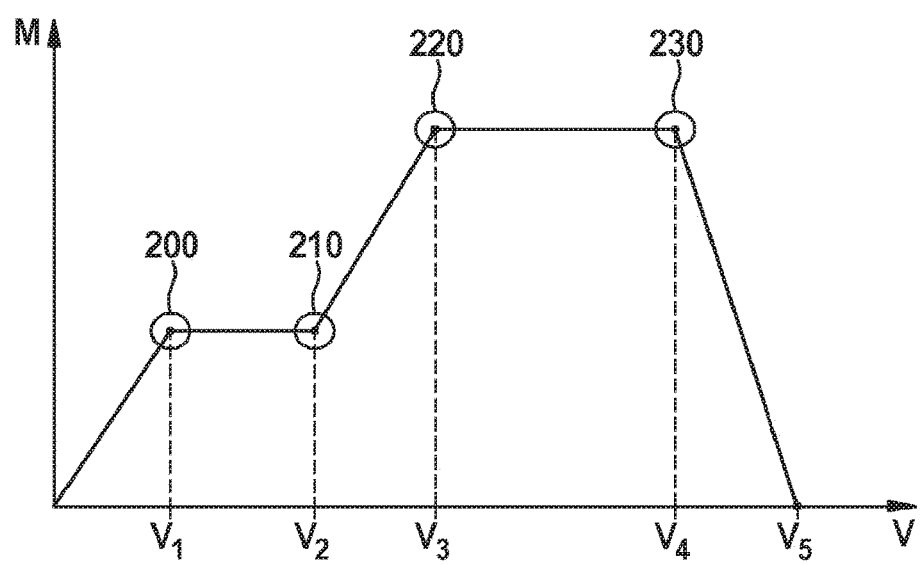
FIG. 2 shows an example of a driver assistance profile.

A driver assistance profile is shown in FIG. 2 as an example. As mentioned above, the driver assistance profile represents the relationship between the motor torque and the pedaling action of the driver, or the desired speed of the driver or the setpoint speed.

Control unit 35 determines the lower and upper limiting values of the predefined range. The two limiting values are situated at an interval of +/−5 km/h, +/−4 km/h, +/−3 km/h, +/−2 km/h, +/−1 km/h around the speed value, at which point the nonconstant change in the dependency relationship is in the driver assistance profile. Alternatively, the limiting values are determined in a range of +/−2.5%, +/−5%, +/−7.5%, +/−10%, +/−15%, or +/−20% around the speed value.

Microcontroller 30 generates a signal 70 for controlling motor 90 as a function of the pedaling action by the driver, the future speed, the predefined range, and the driver assistance profile.

FIG. 2 shows one possible driver assistance profile. The relationship between the assisting motor torque and the pedaling action of the driver, i.e., the operation of the foot pedal by the driver, is shown. In the driver assistance profile in the form of the acceleration by the driver or the pedaling speed of the driver or the driver's desired speed or setpoint speed, i.e., the speed which the driver would like to reach with the aid of the motor assistance, this pedaling action of the driver is depicted on the x axis of the driver assistance profile. The dependency relationship in the driver assistance profile is illustrated in FIG. 2 as a curve which depicts the dependency of the motor torque on the operation of the foot pedal by the driver, i.e., the ratio of the desired or setpoint speed to the necessary motor torque, referred to below as the setpoint curve.

In the driver assistance profile shown as an example, the setpoint curve has predefined ranges 200, 210, 220, 230 which include at least one speed value which, when passed, results in a nonconstant change in the slope of the setpoint curve; i.e., at each of these points the setpoint curve has an inflection point. Due to these inflection points, the assistance changes in a way that is perceptible to the driver when the inflection points are exceeded, by increasing or decreasing the speed, for example by a jerking driving mode of the electric two-wheeled vehicle.

Figure 3:
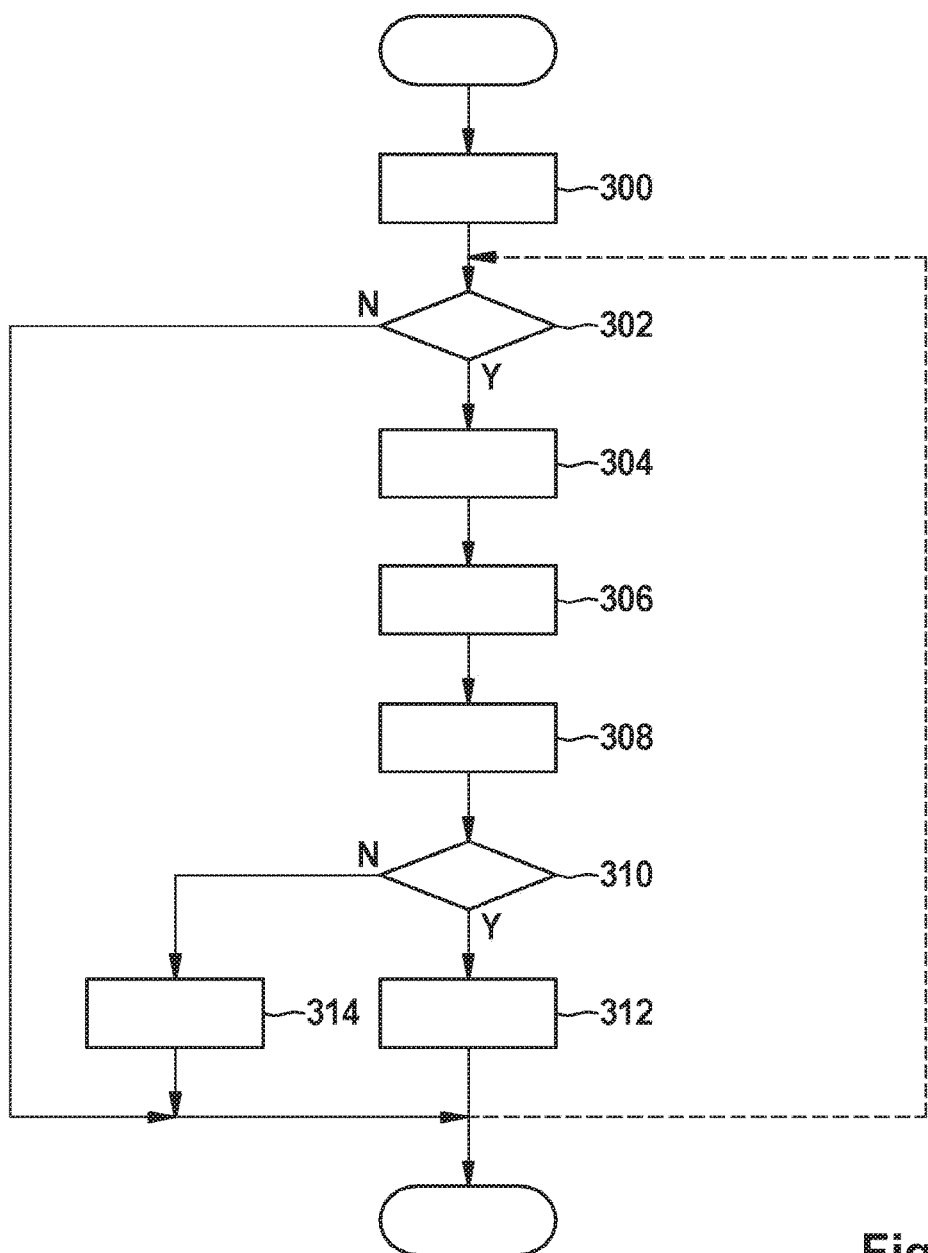
FIG. 3 shows a method for adjusting a motor torque of an electric two-wheeled vehicle.

FIG. 3 shows a method for adjusting the motor torque of the electric two-wheeled vehicle. The method starts with step 300, with reading in a driver assistance profile from memory 80, for example. At least one predefined range in the driver assistance profile is determined in a subsequent step 302. This predefined range is defined in such a way that it includes a point in the driver assistance profile at which the change in the slope of the setpoint curve is nonconstant. If the driver assistance profile has no inflection point, the method is terminated. Optionally, after a change in the driver assistance profile, the method may be restarted by the driver with the aid of the onboard computer. The instantaneous speed of the electric two-wheeled vehicle is detected with the aid of a speedometer, for example, in a further step 304. The operation of the foot pedal by the driver is detected with the aid of a pedaling frequency sensor or a torque sensor on the foot pedal, for example, in a subsequent step 306. A future speed of the electric two-wheeled vehicle is determined in a subsequent step 308. The future speed results as a function of the instantaneous speed and the pedaling action of the driver. A check is made in a subsequent step 310 as to whether the future speed is within one of the predefined ranges. If this is the case, in a further step 312 the assisting motor torque is adjusted, deviating from the setpoint curve of the driver assistance profile, as a function of the pedaling action by the driver. The motor torque may be decreased or increased with respect to the setpoint curve. The change in the motor control is thus perceived by the driver to be more gentle, and the driving comfort of the driver is increased in the entire speed range. If the future speed is not in the predefined range around the inflection point of the driver assistance profile, the assisting motor torque is adjusted in step 314 based on the setpoint curve of the driver assistance profile, and/or the method continues with step 302.

In one exemplary embodiment, the predefined range extends in a range of approximately +/−5 km/h, +/−4 km/h, +/−3 km/h, +/−2 km/h, +/−1 km/h around the speed point at which the driver assistance profile has an inflection.

In another exemplary embodiment, the predefined range extends in a range of up to +/−20%, in particular +/−2.5%, +/−5%, +/−10%, or +/−15%, of the speed around the speed point at which the driver assistance profile has an inflection.

Figure 4:
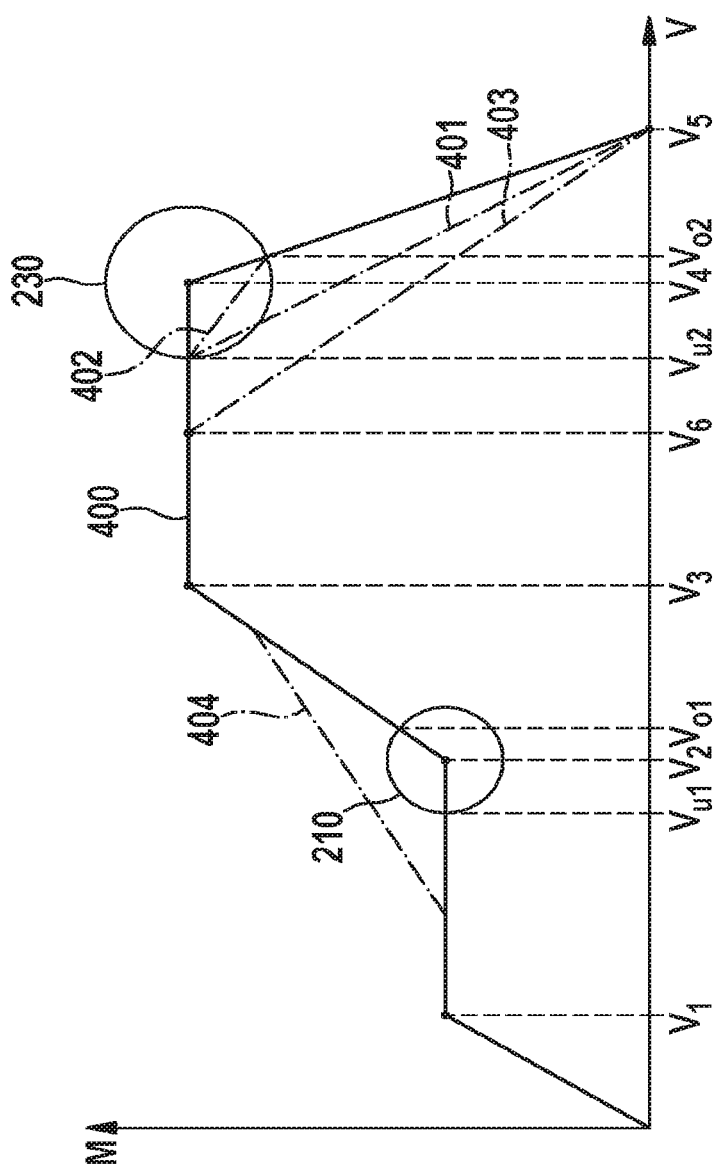
FIG. 4 shows an adapted driver assistance profile.

FIG. 4 shows the driver assistance profile from FIG. 2, which is changed in predefined range 230 with the aid of the method for adjusting the motor torque of the electric two-wheeled vehicle. In addition, FIG. 4 shows lower limit vu2 and upper limit vo2 of predefined range 230. Furthermore, instantaneous speed v6 is indicated for the example.

In one exemplary embodiment, instantaneous speed v6 of the electric two-wheeled vehicle is in the range between speed points v3 and v4. Based on setpoint curve 400 of the driver assistance profile, it follows that the assisting motor torque is constant in this speed range. Predefined range 230 is, for example, +/−2 km/h around inflection point v4. If the driver increases the pedaling frequency or the driver torque so that the future speed is in predefined range 230, the assisting motor torque, deviating from setpoint curve 400 of the driver assistance profile, is changed as a function of the pedaling action by the driver, for example corresponding to ramp 402.

In another exemplary embodiment, for this purpose the motor torque between instantaneous speed v6 and maximum speed v5 is decreased, for example corresponding to ramp 403.

In another exemplary embodiment, the motor torque is changed, beginning when the instantaneous speed v6 exceeds lower limit vu2 of predefined range 230. The motor torque is decreased, either to upper limit vo2 of predefined range 230, or to legally mandated maximum speed v5, for example corresponding to ramp 401.

In another exemplary embodiment, the motor torque is changed, beginning when the instantaneous speed falls below upper limit vo2 of predefined range 230. The instantaneous speed is thus in predefined range 230. The motor torque is increased, for example linearly, to lower limit vu2 of the predefined range.

The adapted profile curve may be in the form of a straight line or also as a curve, for example as an exponential function, so that no, or fewer, inflection points are present in the driver assistance profile.

The driving comfort is thus maintained by adapting the driver assistance profile up to high speeds in the range of 15 km/h to approximately 25 km/h, without exceeding the maximum speed.

In another exemplary embodiment, starting from instantaneous speed v6 of the electric two-wheeled vehicle, the driver increases the pedaling frequency, so that the future speed of the electric two-wheeled vehicle is in predefined range 230. Beginning at instantaneous speed v6, for example, the motor torque is decreased, either as a straight line with upper limit vo2 of predefined range 230, or with maximum speed v5 as the end point.

In another exemplary embodiment, starting from instantaneous speed v6, the driver decreases the pedaling frequency or the overall acceleration, so that the future speed is outside predefined range 230, and the motor torque is thus adjusted based on setpoint curve 400.

In another exemplary embodiment, the instantaneous speed is in the range between v1 and v2. If the driver operates the foot pedal and thus accelerates the electric two-wheeled vehicle so that the future speed is in range 210, the motor torque is increased deviating from setpoint curve 400. This takes place either beginning with the instantaneous speed or beginning with the exceedance of lower limit vu1 of predefined range 210, so that the future speed is within predefined range 210. The end point of the adaptation may be selected to be in the range between the two inflection points v2 and v3, for example upper limit vo1 of predefined range 210. The adaptation takes place in the form of a straight line 404, for example. The adaptation may also take place in the form of an exponential function or a curve which approximates setpoint curve 400, but without having an inflection point. If the future speed exceeds upper limit vo1 of predefined range 210, the motor torque is adjusted as a function of setpoint curve 400. If the driver subsequently reduces the driver torque once again, so that the future speed falls below upper limit vo1 of predefined range 210, the future speed is once again in predefined range 210, and the motor torque is decreased, for example in the form of a straight line, from upper limit vo1 to lower limit vu1 of predefined range 210 as a function of the pedaling action of the driver.

What is claimed is:

1. A method for adjusting a motor torque of a motor of an electric two-wheeled vehicle, the method comprising:
   reading in a driver assistance profile which defines respective values of motor torque to be output in response to respective current vehicle speed values that each corresponds to a respective pedaling action of the driver;
   ascertaining a value of a future speed of the electric two-wheeled vehicle as a function of an instantaneous speed of the electric two-wheel vehicle and a current pedaling action of the driver;
   checking whether the ascertained value of the future speed falls within or is out of a predefined range of a vehicle speed value in the driver assistance profile at which vehicle speed value the driver assistance profile defines a change in a rate at which the values of the motor torque of the driver assistance profile change per change of the vehicle speed values of the driver of the driver assistance profile; and
   responsive to a result of the checking being that the ascertained value of the future speed falls within the predefined range of vehicle speed values, when the pedaling action of the driver corresponds to one of the vehicle speed values for which the driver assistance profile defines a first one of the values of the motor torque, controlling the motor to instead operate with a motor torque value that is different than the first one of the values of the motor torque defined by the driver assistance profile and that is selected based on the pedaling action of the driver.

2. The method of claim 1, wherein a lower and an upper limiting value are determined for the predefined range, the limiting values being determined at +/−5 km/h, +/−4 km/h, +/−3 km/h, +/−2 km/h, or +/−1 km/h around the vehicle speed value at which there is the change in the rate at which the values of the motor torque change per change of the vehicle speed values.

3. The method of claim 2, wherein the controlling includes changing the motor torque linearly between the lower and the upper limiting values of the predefined range, in deviation from a change defined by the driver assistance profile.

4. The method of claim 1, wherein the controlling includes changing the motor torque in a manner that deviates from that specified in the driver assistance profile immediately beginning at the moment when the future speed of the electric two-wheeled vehicle is determined to be in the predefined range.

5. The method of claim 1, wherein the controlling includes deviating a setting of the motor torque from that specified by the driver assistance profile upon reaching a vehicle speed value that exceeds a lower limiting value of the predefined range.

6. The method of claim 1, wherein the controlling includes deviating a setting of the motor torque from that specified by the driver assistance profile upon an instantaneous vehicle speed falling below an upper limiting value of the predefined range.

7. The method of claim 1, wherein the current pedaling action of the driver as a function of which the value of the future speed is ascertained is a pedaling action that accelerates the vehicle, and the motor torque value, with which the motor is controlled to operate instead of the first one of the values of the motor torque defined by the driver assistance profile, is less than the first one of the values of the motor torque defined by the driver assistance profile.

8. A system for adjusting a motor torque of a motor of an electric two-wheeled vehicle, including
a control unit to read in a driver assistance profile which defines respective values of motor torque to be output in response to respective current vehicle speed values that each corresponds to a respective pedaling action of the driver;
a second detecting arrangement to detect an instantaneous speed of the electric two-wheeled vehicle;
wherein the control unit is configured to:
ascertain a value of a future speed of the electric two-wheeled vehicle as a function of the instantaneous speed of the electric two-wheeled vehicle and a current pedaling action of the driver;
check whether the ascertained value of the future speed falls within or is out of a predefined range of a vehicle speed value in the driver assistance profile at which speed value the driver assistance profile defines a change in a rate at which the values of the motor torque of the driver assistance profile change per change of the vehicle speed values of the driver assistance profile; and
responsive to a result of the check being that the ascertained value of the future speed falls within the predefined range of vehicle speed values, when the pedaling action of the driver corresponds to one of the vehicle speed values for which the driver assistance profile defines a first one of the values of the motor torque, control the motor to instead operate with a motor torque value that is different than the first one of the values of the motor torque defined by the driver assistance profile.

9. The system of claim 8, wherein the control unit determines lower and the upper limiting values of the predefined range as a function of the vehicle speed value at which there is the change in the rate at which the values of the motor torque change per change of the vehicle speed values.

10. The system of claim 9, wherein the control includes changing the motor torque linearly between the lower and the upper limiting values of the predefined range, in deviation from a change defined by the driver assistance profile.

11. The system of claim 8, wherein the control includes changing the motor torque in a manner that deviates from that specified in the driver assistance profile immediately beginning at the moment when the future speed of the electric two-wheeled vehicle is determined to be in the predefined range.

12. The system of claim 8, wherein the control includes deviating a setting of the motor torque from that specified by the driver assistance profile upon reaching a vehicle speed value that exceeds a lower limiting value of the predefined range.

13. The system of claim 8, wherein the control includes deviating a setting of the motor torque from that specified by the driver assistance profile upon an instantaneous vehicle speed falling below an upper limiting value of the predefined range.

14. The system of claim 8, wherein the control unit includes a microcontroller.

15. The system of claim 8, wherein the current pedaling action of the driver as a function of which the value of the future speed is ascertained is a pedaling action that accelerates the vehicle, and the motor torque value, with which the motor is controlled to operate instead of the first one of the values of the motor torque defined by the driver assistance profile, is less than the first one of the values of the motor torque defined by the driver assistance profile.

16. A method for adjusting a motor torque of a motor of an electric two-wheeled vehicle, the method comprising:
reading in, by control unit, a driver assistance profile that defines respective motor torque values to be output in response to respective current values of speed, wherein the profile defines an inflection point at which a slope, representing a rate at which the motor torque values of the driver assistance profile change per change of the speed values of the drive assistance profile, changes, wherein the inflection point is at a particular one of the speed values defined by the driver assistance profile;
determining, by the control unit, a value of a future speed based on sensor values including a value of an instantaneous speed;
checking, by the control unit, whether the determined future speed is within or is out of a predefined range of the particular speed value of the inflection point of the profile;
responsive to a result of the checking being that the determined future speed is within the predefined range of the speed value of the inflection point of the profile, modifying, by the control unit, the respective motor torque value of the profile for one or more of the speed values of the profile; and
controlling, by the control unit, the motor torque based on the modified torque value of the profile.

17. The method of claim 16, wherein the determining of the value of the future speed is further based on a driver pedaling action accelerate the vehicle, and the modification of the respective motor torque value of the profile for the one or more of the speed values of the profile is a decrease of the respective motor torque value of the profile for the one or more of the speed values of the profile.

* * * * *